United States Patent [19]

Negishi

[11] Patent Number: 4,510,560

[45] Date of Patent: Apr. 9, 1985

[54] DEVICE FOR CONTROLLING LIGHT IMAGES

[76] Inventor: Masataka Negishi, 1000, Oaza Ryoke, Urawa-shi, Saitama-Ken, Japan

[21] Appl. No.: 448,918

[22] PCT Filed: Apr. 20, 1982

[86] PCT No.: PCT/JP82/00130

§ 371 Date: Dec. 7, 1982

§ 102(e) Date: Dec. 7, 1982

[87] PCT Pub. No.: WO82/03676

PCT Pub. Date: Oct. 28, 1982

[30] Foreign Application Priority Data

Apr. 20, 1981 [JP] Japan .................................. 56-58419

[51] Int. Cl.[3] ........................ F21V 13/04; G02B 19/00

[52] U.S. Cl. .................................... 362/299; 362/296; 362/308; 362/309

[58] Field of Search ................ 362/296, 299, 308, 309

[56] References Cited

U.S. PATENT DOCUMENTS

| | | | |
|---|---|---|---|
| 3,588,492 | 6/1971 | Pollock | 362/309 |
| 3,725,697 | 4/1973 | Wince | 362/309 |
| 4,263,641 | 4/1981 | Ferrero | 362/309 |
| 4,369,488 | 1/1983 | Brun | 362/309 |

*Primary Examiner*—Donald P. Walsh

*Attorney, Agent, or Firm*—Wenderoth, Lind & Ponack

[57] ABSTRACT

A device for controlling light images has a light source forming a light spot or light spot group, a reflection device positioned relative to said light source for receiving all of the light rays from the light source and reflecting the light rays, and a light direction changing surface positioned relative to the reflection device for receiving the reflected light rays from the reflection device. The reflection device has a generally planar or curved fresnel mirror type reflecting surface having thereon a plurality of minute prism-shaped elements disposed in minute parallel ridges, or a specially curved surface. The angles of the surfaces of the ridges or the curved surface causes the light to be reflected therefrom in non-parallel directions for spreading the light rays in a uniform light intensity distribution on the light direction changing surface.

24 Claims, 20 Drawing Figures

DEVICE FOR CONTROLLING LIGHT IMAGES

TECHNICAL FIELD

This invention relates to a device for controlling light images and which can be used as a surface illumination device, a picture image forming device, a light transmission device, and the like by operations such as causing light rays from a light spot (or luminous point) or a group of light spots to be reflected by a reflection device thereby to be projected, as incident light in a state wherein it has been so controlled as to have a specific light ray distribution, toward a surface for changing light directions and such as causing incident light directed toward a surface for changing light directions to be reflected by a reflecting device thereby to be transmitted in reverse toward the position of a light spot or a group of light spots.

BACKGROUND ART

A surface light source is not limited to merely illumination but is desired in many fields for decorations, advertisements, optical devices, etc.

As a prior art surface light source, electro-luminescence is in the spotlight, but, in actuality, it has not reached the point of practicality. A surface light source of this type is limited in its emitted light colors, and further its light quantity (or luminous energy) is not sufficient. Other than this, as a system for obtaining a surface light source, there is a system using light-guiding prisms, but with this system, a surface light-emitting source of small thickness cannot be obtained, and, moreover, there are problems with the light quantity and price.

At present, a common surface light source in practical use is a type wherein a plural number of fluorescent lamps are arranged in a row, and a diffusion plate is disposed in front thereof. However, with this system, in order to obtain a surface in which the light quantity has been equalized to an extent such that the forms of the fluorescent lamps cannot be distinguished, two or more diffusion plates must be used in superposition which greatly reduces the quantity if light transmitted from the light source. On one hand, with a surface light source of this type, since a light source, or sources, must always be disposed behind the light-emitting surface, the installation of the surface light source device is impossible in a case such as where there is no space for installation of the light source behind the light-emitting surface.

It is an object of this invention to provide a device for controlling light images which can be used as a surface light source device without the problems as described hereinbefore and, at the same time, also as a device for forming again or projecting a light image at a position remote therefrom and, further, can be used for various uses by causing light to pass through reverse paths.

DISCLOSURE OF THE INVENTION

The device for controlling light images of this invention has means having a position (or positions) for forming a light spot or a light spot group, a reflection device which, upon receiving light rays from a light spot or light spot group, reflects the same, and a surface for changing light directions provided at a position reached by reflected light reflected by this reflection device, the above described reflection device having a reflecting surface of a shape such as to spread of the reflected light reflected thereby in a surface shape with a controlled specific light-ray distribution at the light direction changing surface.

Since, as a matter of natural course, the path of propagation of light has reversibility, if light is passed in the reverse direction from behind the light direction changing surface in the above described device for controlling light images, the light will travel in reverse and be reflected by the reflecting surface to reach the light spot or light spot group. Accordingly, this light image controlling device can be used for various purposes as described hereinafter by passing light in the reverse direction.

A light spot is geometrically a point, but in the case where the electric lamp is very small, it can be regarded to be substantially a point, while a volumetric light source such as a large electric lamp or a fluorescent lamp can be considered to be a collection of a plurality of light spots, that is, a continuous light spot group. Furthermore, a light beam containing an image can also be considered to be a collection of various light spots of one group. Therefore, in the following description and the claims, the term light spot will be used in the sense including the various cases set forth above.

Furthermore, in the following description and the claims, changing the direction of light shall be understood to mean a variation of the advancing direction of light due to refraction, reflection, etc. Further, since diffusion of light is also a phenomenon in which the direction of a light beam advancing and arriving is changed into various directions, it is similarly included in the phrase "change of light direction".

BEST MODES FOR CARRYING OUT THE INVENTION

The device for controlling light images according to this invention can be used as a surface light source by causing a bright light beam to reach a specific distribution a surface for changing light directions and, further, can be used also as a remote picture forming device by causing a light image from a position separated from a surface for changing light directions to reach that surface. In addition, it can also be used for other purposes by passing light in the reverse direction along travel paths of light rays.

Figure 1:
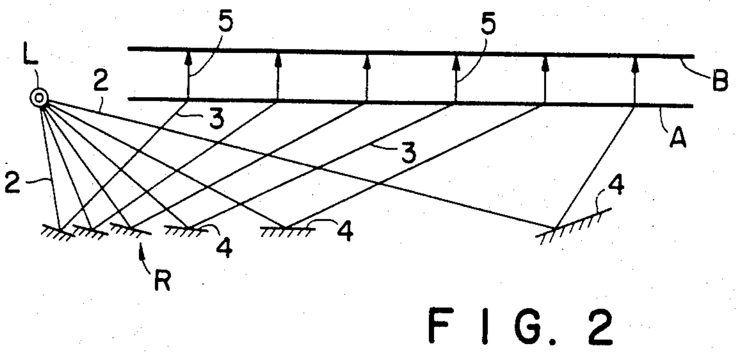
FIG. 1 is a diagrammatic view indicating the principle of this invention.

FIG. 1 is a view showing the principle for the case wherein this invention is used in a surface light source device. In this figure, L is a point light source as one example of a local light source and forms a light spot. From the local light source L, emitted divergent light 2 is projected toward a reflection device R. Light 3 reflected by the reflection device R is projected toward a light direction changing surface A. As much of the light beam from the local light source L as possible (all of it, if possible) is condensed thereby to eliminate waste of light.

The reflection device R has a large number of reflecting surfaces 4 at different inclination angles, and the incident light angles of the light rays 2 projected toward these reflecting surfaces 4 are all different. The angles of these reflecting surfaces 4 are so determined that the light rays 3 reflected thereat constitute a uniformly distributed incident light toward the light direction changing surface A. In this connection, imparting to the changing surface A a non-uniformly distributed incident light of a previously determined distribution state is also possible by properly selecting the angles of the reflecting surfaces 4. For example, by making the inclinations of a number of the reflecting surfaces 4 on the leftward side in the figure steep, a greater number of light rays are directed toward the rightward side in the figure of the changing surface A.

Behind the changing surface A, a diffusing surface B can be provided if necessary. The light rays 3 projected onto the changing surface A can be used merely for the purpose of illuminating the changing surface A, but ordinarily they are refracted in the process of passing through the changing surface A and are changed into parallel light rays as designated by 5. This reflection is one mode of change of light direction. The changing surface A ordinarily has a special constitution as described hereinafter, which makes possible refraction such as to obtain, for example, parallel light rays 5. The diffusing surface B is the last surface to receive the light 5 which has passed through the changing surface A, and here the parallel light rays 5 are diffused, and, in the case of uniformly distributed light, their uniformity is even more enhanced. The diffusing surface B in this case is the final picture forming surface.

Figure 2:
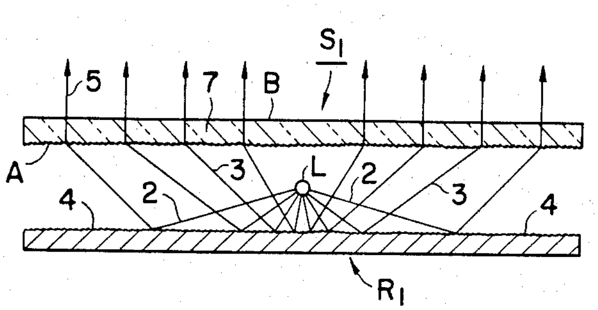
FIG. 2 is a sectional view showing one example of the device of the invention.

FIG. 2 shows a specific concrete example of a surface light source device based on the principle shown in FIG. 1. In the surface light source device $S_1$ of FIG. 2, a reflection device $R_1$ has a reflecting surface 4 having a shape wherein countless minute prism-like structures are aligned in saw-tooth form. The countless minute prism-like structures are designated by P in the enlarged view of FIG. 3. This reflection device $R_1$ has the shape of a fresnel mirror. The local light source L in this example is provided in the central part, and light 2 from the light source L is reflected by reflecting surfaces 4 constituting the front surfaces of respective prism-like structures P. The reflected light rays 3, by like structures P. The reflected light rays 3, by reflection by the reflecting surfaces 4 formed symmetrically with respect to an imaginary centerline in the up-and-down direction (in FIG. 2) passing through the light source L of the central part, are similarly sent symmetrically to the light direction changing surface A.

The reflection device $R_1$ can be formed by a thin plate of a synthetic resin, a metal, glass, etc. In this case, in order to obtain reflecting action at the reflecting surfaces, it is good to provide a reflecting layer of aluminum or some other material on the front surfaces of the prism-like structures P by a method such as vacuum deposition or plating.

The light rays 3 reaching the light direction changing surface A due to the reflection device $R_1$ are ordinarily in a uniformly distributed state but, depending on the design of the reflection device $R_1$, can be in any desired non-uniformly distributed state. This point is the same also with respect to the reflection device of another example of the invention described hereinafter.

In this example, the changing surface A and the diffusing surface B are formed by one face and the other face of the same thin plate 7 as shown in FIG. 2. The thin plate 7 is formed from a transparent plate or a cloudy (frosted) plate. The material of the thin plate 7 is preferably glass, synthetic resin, or the like. The face B of the thin plate has, for example, a planar form, and the face A is formed with a shape wherein countless minute prisms $P_1$ are aligned in a row in saw-tooth form as shown in FIG. 3. Accordingly, the thin plate 7 constitutes a fresnel lens. The inclination angles of sloped surfaces 8 of these prisms $P_1$ are suitably determined so that light rays 3 projected onto the changing surfaces A will be changed, for example, into the aforedescribed parallel light rays 5. The angles of the sloped surfaces of the prisms P and $P_1$ for obtaining the light rays 3 and 5 differ for every prism can be determined by design computation by means of an electronic computer.

For obtaining the diffusing surface B, a suitable translucent layer or a frosting processed layer can be applied to the face B of the thin plate B. In the case where this surface light source device is to be used for illumination, the face B of the thin plate 7 may be provided with a frosting processed layer or the thin plate itself may be formed from a cloudy (or frosted) material, but in the case where it is to be used for display purpose, the thin plate is made of a light diffusing material, and on its surface, various pictures, photographs, characters, etc., are applied by laminating or printing, or pictures, photographs, characters, etc., made of light diffusing material are applied on a transparent thin plate.

In the foregoing description, the changing surface A of the thin plate 7 has the capability of changing the light rays 3 into parallel light rays 5, but it is also possible, by selecting the angles of the prisms P, to direct the light rays 5 in any desired directions. This is also true for another example of the invention described hereinafter.

Figure 3A:
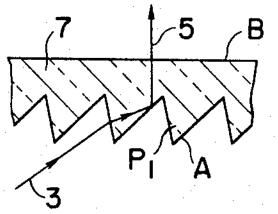
FIG. 3A is a view showing a modification of the fresnel lens shown in FIG. 3.
Figure 3:
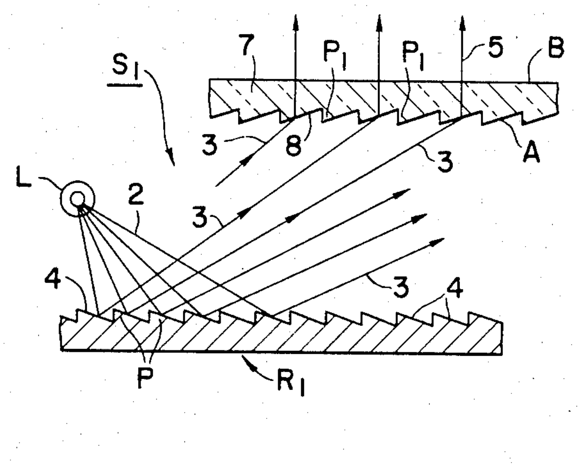
FIG. 3 is an explanatory figure showing on an enlarged scale the essential parts of FIG. 2.

FIG. 3A shows another example of the prisms $P_1$ of the thin plate 7. In this example, even when the angles of the light rays 3 relative to the face A become very small, parallel light rays 5 or light rays in any direction can be obtained by utilizing full reflection within the interior of the prisms $P_1$.

In the examples illustrated in FIGS. 2, 3, and 3A, one portion of the light from the light source L is projected directly onto the changing surface A. In the case where this sort of direct light is useful for distribution of light rays at the face A, it is satisfactory, but in the case where such a light is detrimental for light-ray distribution at the face A, the projection of the light from the light source L toward the face A is prevented by a suitable cover, or an auxiliary mirror is interposed between the light source and the thin plate as in an example described hereinafter.

Figure 4:
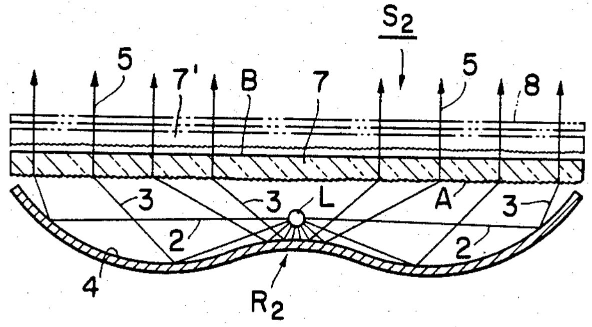
FIGS. 4 through 7 are sectional views respectively showing different examples of this invention.

In FIG. 4 is shown another example of this invention. The surface light source device $S_2$ according to this example differs from the surface light source device $S_2$ of FIG. 2 only in the constitution of the reflection device $R_2$. This reflection device $R_2$ comprises a plate such as a metal plate formed by means such as a press so as to have a specific curved surface, or wherein a plastic mirror is applied onto the surface of a plastic molded article of a specific shape, and this curved surface, similarly to the already described case, constitutes a continuous reflecting surface 4 which has been designed so that radiant light 2 from a local light source L will fall as evenly distributed incident light rays 3 onto the changing surface A. This continuous reflecting surface 4 constitutes a curved surface of non-spherical shape in the case where the light source L is a point light source and constitutes a curved shape of non-cylindrical surface in the case where the light source L is a line light source in the direction perpendicular to the paper plane.

In the case where the refraction at the changing surface A is insufficient for obtaining the parallel light rays 5, a thin plate 7′ similar to the thin plate 7 may be further added if necessary. Furthermore, the diffusing effect may be obtained by using a separate diffusing plate 8. Still furthermore, the light rays 3 may be changed by the thin plates 7 and 7′ into non-parallel light rays directed in any desired directions.

Figure 5:
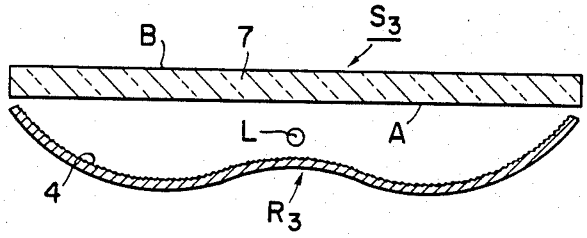

In the example illustrated in FIG. 5, the reflection device $R_3$ of the surface light source device $S_3$ is constituted by a combination of the characteristics of the reflection device $R_1$ of FIG. 2 and the reflection device $R_2$ of FIG. 4. This reflection device $R_3$, similarly to the reflection device $R_2$, is constituted by a curved surface plate, and, further, its reflecting surface 4 is a fresnel mirror as shown in FIG. 3. Because of its having a fresnel mirror, the shape of the curved surface plate constituting the reflection device $R_3$ becomes, as a natural result, different from the shape curved surface plate $R_2$ constituting the reflection device $R_2$. In this example, the thin plate 7 comprises a light diffusing plate, and its changing surface A is formed merely as a planar surface. The light rays 3, after being projected onto the face A, are diffused in countless directions by the light diffusing characteristic of the thin plate 7 itself. Therefore, the face A is a means for varying the direction of light and is a direction changing surface. If the diffusing characteristic of the thin plate 7 is almost perfect, evenly distributed light will be obtained at the face B.

Figure 6:
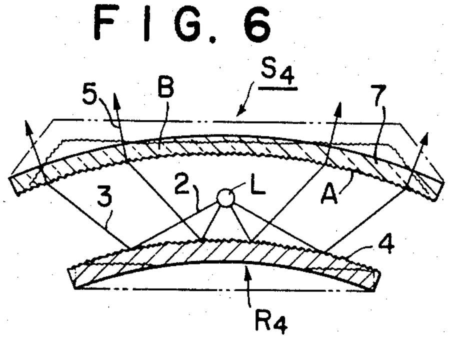

The principle of this invention can be applied also to the case wherein the changing surface A and the diffusing surface B are not planar surface but are curved surfaces. One example of this is shown in FIG. 6, in which the surface light source device $S_4$, similarly to the surface light source device $S_1$ of FIG. 2, comprises a reflection device $R_4$ having a reflecting surface 4 functioning as a fresnel mirror and a thin plate 7 having changing surface A comprising a saw-tooth prism surface, and the thin plate 7 is formed as curved surface plate. In order to send light rays 3 of a desired distribution to the changing surface A of this curved surface plate, the reflection device $R_4$ is also formed in a curved surface shape as a whole. It is to be noted that the reflection device $R_4$ may be replaced by a reflection device such as the curved surface plate shown in FIG. 4. Furthermore, the reflection device $R_4$ may be formed in the shape of a flat plate as indicated by the chain line, and the thin plate 7 may be formed with a shape other than a curved surface such as, for example, a trapezoid as indicated by the chain line.

In the case where the surface light source device according to this invention is to be used for a display purpose, the positioning of the light source L at the central part is not desirable in many instances. In such a case, the light source L can be disposed at an end part as in the surface light source device $S_5$ of FIG. 7.

Figure 7:
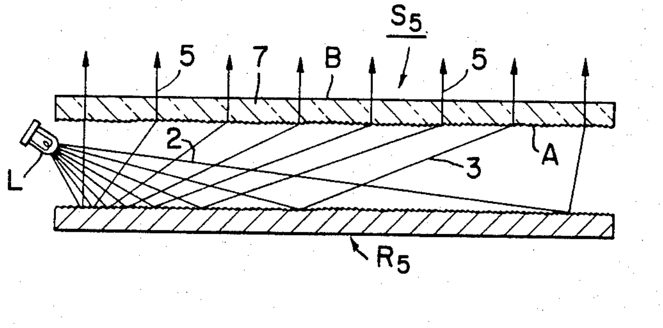
Figure 8:
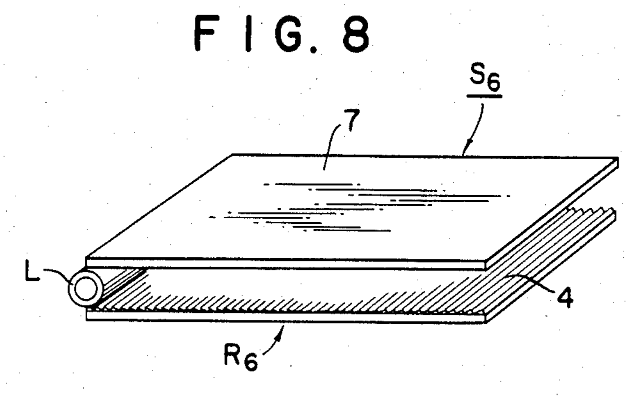
FIGS. 8 and 9 are perspective views respectively showing different examples of this invention.

FIG. 8 shows a surface light source device $S_6$ in which a line light source such as a fluorescent lamp is used as the light source L and is installed at an end part. The principle of this device is the same as the case of FIG. 7.

Figure 9:
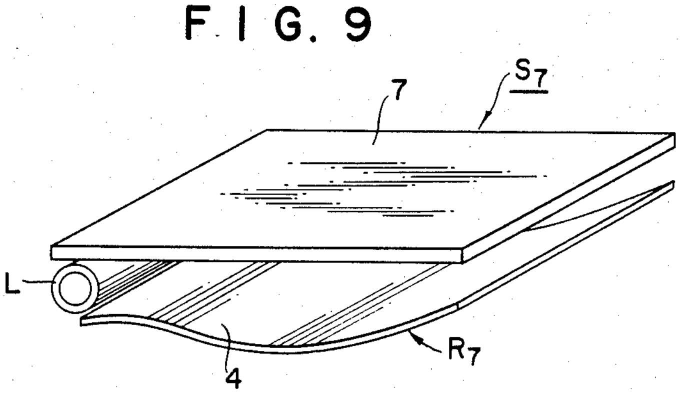

In the surface light source device $S_7$ of FIG. 9, the reflection device $R_7$ for light from a line light source L at an end part is formed by a curved surface plate similarly to the case of FIG. 4.

Figure 10:
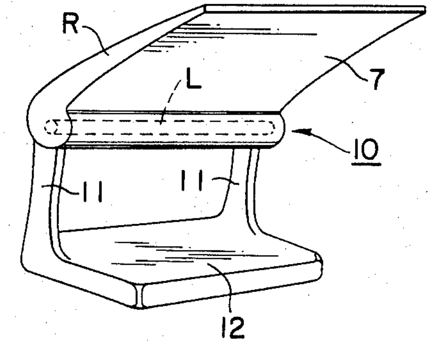
FIG. 10 is a perspective view showing an example of this invention applied to an electric lampstand.

The structures of FIG. 8 and FIG. 9 can be applied, for example, to an electric lightstand 10 as shown in FIG. 10. In this figure, a fluorescent lamp L is installed at the end part of a space between a thin plate 7 for illumination purpose and a reflection device R therebehind, and the assembly of the thin plate 7 and the reflecting device R is supported on a base 12 by legs 11. In this lightstand 10, the entire surface of the thin plate 7 emits light due to the line source shape of the fluorescent lamp L, and illumination by a surface is carried out. By this sort of illumination, shadows are not formed; the light does not dazzle; and eye fatigue due to illumination conditions is eliminated.

Figure 11:
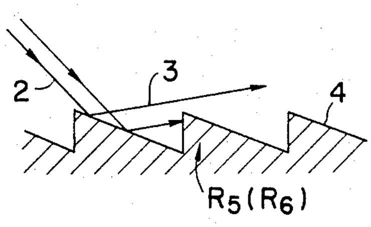
FIG. 11 is an enlarged sectional view explanatory of a problem with a fresnel mirror surface.
Figure 12:
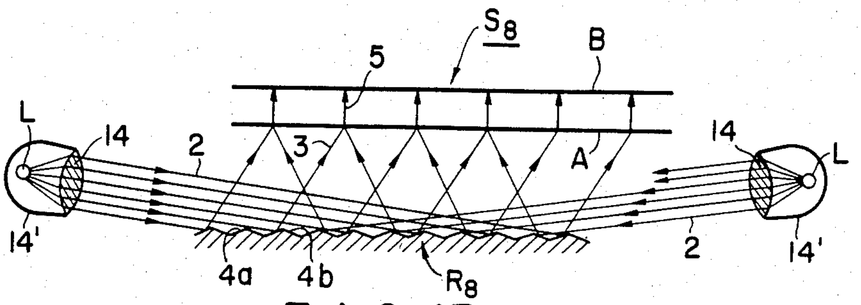
FIGS. 12 and 13 are explanatory views respectively showing different other examples of the invention.

In the case where the light source L is disposed on one side as shown in FIG. 7 and FIG. 8, and, moreover, a thin shape is adopted as a whole, there arises a phenomenon wherein one portion of the reflected light rays 3 is obstructed by the top parts of the prismatic structures and therefore does not reach the changing surface A, as indicated in FIG. 11, at parts remote from the light source L if the fresnel mirror reflecting surface 4 of the reflection devices $R_5$ and $R_6$. For avoiding such a phenomenon, the reflecting surface of a reflection device $R_8$ as in a surface light source device $S_8$ of FIG. 12 is formed by a large number of ridges each having on both sides a pair of symmetrical reflecting surfaces 4*a* and 4*b* whose sloping directions are different. By this, the occurrence of the above described phenomenon can be reduced, and, moreover, by providing light sources L at both ends, both reflecting surfaces 4*a* and 4*b* can be effectively used for reflecting.

Furthermore, by providing aspherical lenses 14 in front of the light sources L and aspherical mirrors 14′ to cause the light from the light sources to become uniformly distributed and, moreover, to be emitted from the light sources as parallel light rays 2 as shown in FIG. 12, the vertex angles of the reflecting surfaces 4*a* and 4*b* can be made uniform over the entire reflection device $R_8$, and the selective determination of the spacing between the reflecting surfaces 4*a* and 4*b* and the changing surface A can be made freely. Furthermore, shifting of the light sources L relative to the up-and-down directions of the figure merely causes the occurrence of a little variation in the incidence angle toward the dispersion surface B, and the degree of freedom in design becomes great. The light 2 from point light sources or line light sources L become parallel light rays due to the lenses 14, etc., as described above, but even if the width of these parallel light rays is small, the reflected light 3 produced by the reflecting surfaces 4*a* and 4*b* of the reflection device $R_8$ become parallel light rays of broad width. Thus, this reflection device $R_8$ constitutes a system for conversion from narrow parallel light rays to broad parallel light rays, whereby it becomes possible to make the surface light source device thin.

Figure 13:
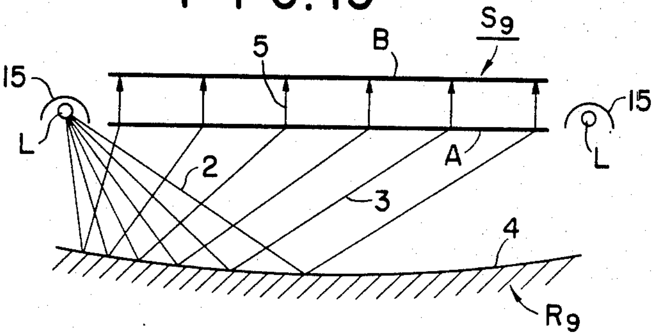

In the surface light source device $S_9$ shown in FIG. 13, light sources L are similarly provided on both sides, and the reflection device $R_9$ has a reflecting surface 4 in the shape of a concave curved surface of left-right symmetrical shape. The light sources L have auxiliary mirrors 15 using in the form of half mirrors, and by this, darkening of the changing surface A behind the mirrors 15 is prevented. If, in this case, there is a nonuniformity in height, etc., of the mirrors around the left and right light sources, left-and-right symmetry will no longer exist.

Figure 14:
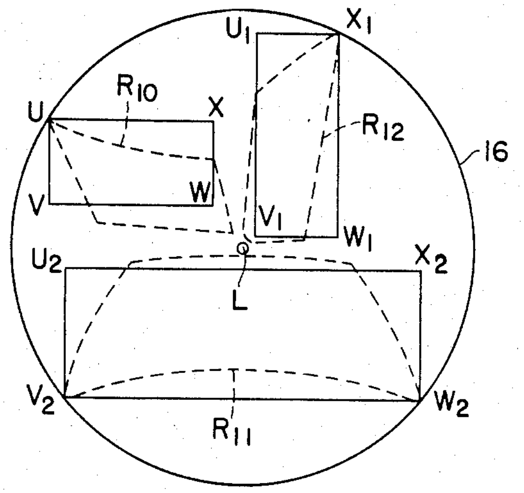
FIG. 14 is a diagram of one example of a positional relationship between a light source, an illuminating surface, and a reflecting device.

FIG. 14 shows one example of application of the principle of this invention to a surface light source device. In the figure, L is a point light source, and, within the scope of a circle 16 with this point light source as its center, over the entire region of which uniform light rays are distributed, light is to be caused to be distributed on only the rectangular parts designated by U-V-W-X, $U_1$-$V_1$-$W_1$-$X_1$, and $U_2$-$V_2$-$W_2$-$X_2$. For this purpose, reflection devices having respective shapes indicated by dash lines $R_{10}$, $R_{11}$, and $R_{12}$ can be installed at positions spaced from the light source L. In this manner, according to this invention, light can be caused to be distributed at parts of arbitrary shape at positions which are relatively greatly spaced from the light source. The light in a state of uniform distribution can be caused to reach desired regions, but, as already described, depending on the design of the reflecting surface 4 of the reflection device R, it is also possible to cause the light to be distributed in great quantity on specific parts and to cause the distribution of light of other parts to be in small quantity, and the light quantity can also be caused to vary gradually. The design of the reflecting surface 4 and the design of the changing surface A of the proper character can be carried out by an electronic computer if the shape of the changing surface, the position of the light source, etc., are given.

In the case where the spacing between the reflecting surface 4 of the reflection device and the changing surface is narrow, and, moreover, the light source is offset for toward one side of the space therebetween, the angle formed between the light incident on the reflecting surface and that reflecting surface, that is, the incidence angle, becomes small, and for this reason the degree of illumination as a whole becomes small. Accordingly, the installation of the light source at a position near the reflecting surface is preferable, but in a case where the light source must be disposed far away, it is desirable, in order to utilize light rays effectively in directions other than those incident to the reflecting surface from the light source, to provide an auxiliary mirror behind the light source thereby to cause these light rays to be directed toward and reflected by the reflecting surface.

Figure 15:
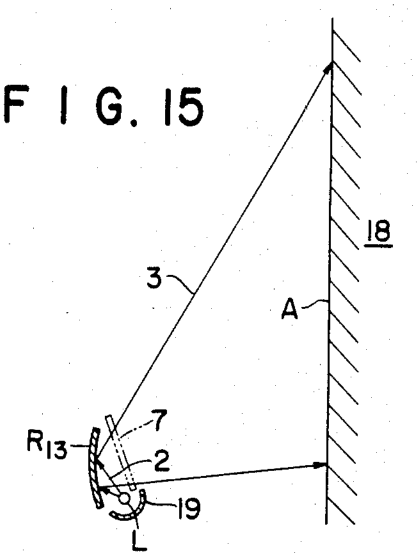
FIG. 15 is a diagram of one example of indirect illumination of a surface such as a wall surface.

FIG. 15 illustrates an example of the use of the principle of this invention in the illumination of a surface of a wall 18 and the like. In this example, a local light source L transmits light 2 toward a reflection device $R_{13}$ similar to the already described reflection devices, and the reflected light 3 reaches the face of the wall 18. The face of the wall corresponds to the changing surface A in the already described examples. At this changing surface A, the directions of the light rays which have arrived are changed by reflection and, reaching the human eye, are recognized as a picture. It is to be noted that this example is not limited to illumination of walls, but indirect illumination of license plates of motor vehicles and any other surfaces can be carried by using the principle of this invention. In this connection, in this indirect illumination method, an auxiliary mirror 19 may also be used in order to effectively utilize the light from the light source.

In this connection, also, as shown by chain line 7 in FIG. 15, a fresnel lens or another lens system corresponding to a thin plate may be provided thereby to control the directions and distribution state of the light rays 3 toward the wall 8. In this case, the surface on the opposite side of the changing surface A of the thin plate 7, differing from the aforedescribed diffusing surface B, is a surface which does not have a diffusing function.

Figure 16:
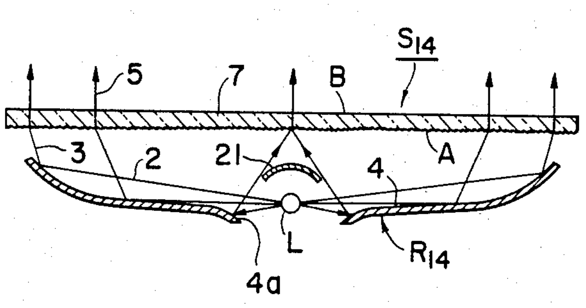
FIG. 16 is a sectional view of one example of the invention in which the light source is provided with a reflecting mirror.

The surface light source device $S_{14}$ shown in FIG. 16 is the same in principle as the surface light source device of FIG. 4, but is different in the point that a reflecting mirror 21 is provided behind the light source L thereby to effectively utilize the light and in the point that an innovation has been given to the shape of the reflecting surface of the reflection device $R_{14}$. In order to prevent the formation of a shaded part at the central part of the thin plate 7 due to the installation of the reflecting mirror 21, in this example the central part 4*a* of the reflecting surface 4 is given a concave shape as shown in the figure, and by this means, light rays 3 from the reflecting surface also reach behind the reflecting mirror 21 so as not to create a shaded part. The reflecting mirror 21 is, for example, an elliptical mirror, and at one of its two focal points, the light source is positioned. By this means, an imaginary light source is caused to exist at the other focal point, and circumstances, as in the case where a light source is placed at the center of a spherical mirror, wherein the light leaving the light source returns again to the light source and impinges on the filament of the light source, thereby not contributing essentially to the effective utilization of the light quantity or reducing the life of the filament, etc., do not occur. In this connection, it is preferable to place the two focal points of the elliptical mirror as close together as possible so that the two focal point parts become substantially one light spot.

Figure 17:
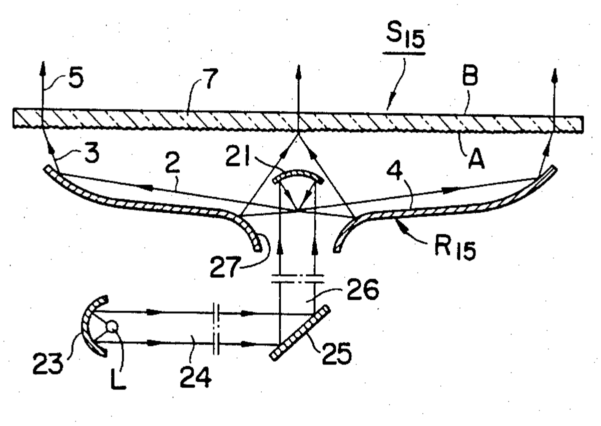
FIG. 17 is a sectional view showing one example of the invention in which the light image controlling device main body and a local light source are connected by way of a light guide part.

In the surface light source device $S_{15}$ shown in FIG. 17, the light source L is provided at a remote place relative to the space between the thin plate 7 and the reflection device $R_{15}$, and a light source is not provided in front of the reflecting mirror 21. Behind the light source L, there is a reflecting mirror 23, and light reflected here advances through a light-conducting part 24, is reflected by a reflecting mirror 25, thereafter passes through another light-conducting part 26, reaches the reflecting mirror 21 through an opening 27 in the central part of the reflection device 15, and forms an image at the focal point position thereof. Therefore, similarly to the case of FIG. 16, light is distributed over the entire surface of the thin plate 7. This device is extremely suitable for disposal of the heat generated from the light source. That is, since the light source L, which is a heat generating part, is on the outside of the structure, this device is suitable for use in measuring instruments, illuminating equipment, etc.

Figure 18:
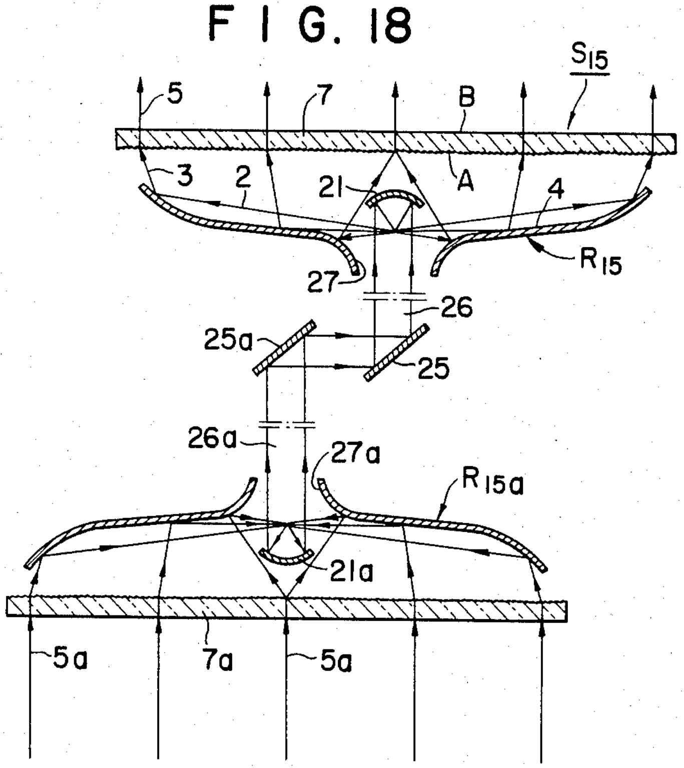
FIG. 18 is a sectional view showing an example wherein the device shown in FIG. 17 is used for the purpose of forming a picture.

In the example of FIG. 18, the diffusing surface B of the surface light source $S_{15}$ shown in FIG. 17 is used, not as a light emitting surface for illumination, but as a surface for forming pictures. To cause the face B to be a picture forming surface, a surface light source device $S_{15a}$ of the same construction as the surface light source device $S_{15}$ is used, and onto the surface of its thin plate 7*a*, a suitable light image is projected as indicated by 5*a*. This light image advances toward the reflection device $R_{15a}$ as indicated by 3*a* and 2*a*, is reflected thereby, passes from the reflecting mirror 21*a* through a light-conducting part 26*a* to advance toward a reflecting mirror 25*a*, is reflected there, is thereafter further reflected by a reflecting mirror 25, and advances toward the reflecting mirror 21. The light travel thereafter is the same as that described with respect to FIG. 17, and an image corresponding to the supplied light image is projected onto the surface B of the thin plate 7. Thus, the supplied light image passes through the light-conducting parts 26*a*, 26, etc., and is reproduced at a remote place. In this manner, the principle of this invention can be used for obtaining a surface light source and further also for projecting a light image which has been transmitted. A light image can be regarded as a group of light spots as already described. By varying the relative dimensions of the device $S_{15}$ relative to the device $S_{15a}$, it is possible, of course, to cause the supplied light image to be enlarged or reduced in size and projected. Furthermore, instead of the device $S_{15a}$, an ordinary lens system may be used to send the light image toward the reflecting mirror 21. In this case, the uniformity of distribution of the light image is inferior.

The light rays 5 from the device $S_{15}$ can be used for the purpose of projection of an image against an outside wall surface or the like if the thin plate 7 is transparent and the surface B does not have light diffusibility. Accordingly, by the projection of a light image onto the surface of the thin plate 7*a*, these devices $S_{15}$ and $S_{15a}$ exhibit the function of a projector. Thus, in this invention, the diffusing surface B is not indispensable. Also in the examples described so far, this invention can be used for the purpose of projecting pictures toward the outside by eliminating the light diffusibility of the face B and making the thin plate 7 transparent.

As described above, the device for controlling light images of this invention can be used for surface illumination and transmission of pictures but, by the principle of reversible advance, it can be used by causing light to pass in the reverse direction along the same path.

For example, when, in FIG. 18, the thin plate 7 is made of a transparent material, and sunlight, for example, is caused to enter as incident light in the direction reverse to the direction of the light rays 5, in the case where the thin plate 7*a* of the device $S_{15a}$ comprises a light diffusing plate, the thin plate 7*a* as a whole glows white. On the other hand, in the case where the thin plate 7*a* is a transparent plate, the sunlight emanates as it is and is sharply irradiated on the surface of a wall or the like. When, instead of sunlight, a flashlight is used to irradiate the surface of the thin plate 7 with light, the light of the flashlight is emitted from the surface of the thin plate 7*a*. However, when the thin plate 7 on the light incident side is a light diffusing plate, the light reaching the thin plate 7*a* becomes only an effective incident light along the path of the light rays 3, and for this reason the light image of the thin plate 7*a* becomes a dark one. Furthermore, when, in the device $S_{15}$ of FIG. 17, sunlight, for example, is caused to enter as incident light in the reverse direction the surface of the thin plate 7, an image is formed at the position of the light source L, whereby heating of an object there can be carried out.

Figure 19:
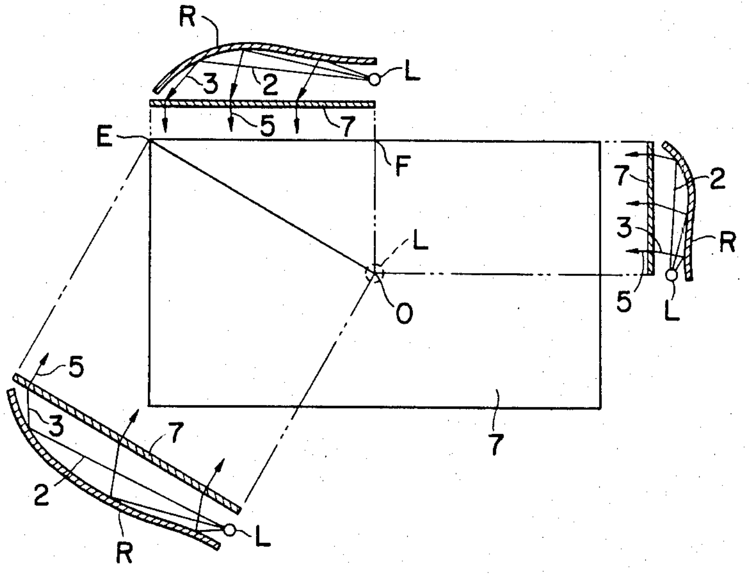
FIG. 19 is an explanatory diagram with respect to three-dimensional regulation of the distribution of light projected relative to a surface for change of light direction.

FIG. 19 is an explanatory view of means which, in the case where a surface light source device of this invention is used, produces three-dimensionally uniform light quantity distribution. In the case where a light emitting surface comprising a thin plate 7 has an asymmetrical shape with respect to a point light source L, such as a rectangle, as in FIG. 19, with regard to a region along a line from the center O of the thin plate 7 joining a point F on a near edge and a region along a line from the center O joining a point E on a far edge, if the reflection device were to be designed two-dimensionally so that the light quantity distribution is uniform along these lines, the latter region would become darker than the former region. The reason for this is that, as will be apparent from sections along the lines OE and OF shown at the lower left and right side of the same figure, an equal light quantity in the section along the line OE is distributed over a longer expanse than that in the section along the line OF.

In order to solve such a problem, as shown in the section at the upper left of the same figure (the section along a line parallel to the line EF), the reflection device R must be so designed that, with respect to its sectional direction, it will distribute the reflected light 3 more toward the left (in the figure). This distribution is so made that it varies continuously with respect to countless sections parallel to the line EF. By this measure, the light quantity from the light source L becomes uniformly distributed over the entire surface of the light emitting surface. It is to be noted that auxiliary mirrors and other various auxiliary means described in connection with the already described examples can also have this three-dimensional example applied thereto.

As described above with respect to the examples, by this invention, by using a local light source such as a point light source or line light source, a surface light source having a uniform or a desired nonuniform light quantity distribution can be obtained at low price. Furthermore, the reflection devices, etc., used in this invention, if produced in great quantity, can be obtained at a very low price. By this invention, furthermore, soft illumination without glare from a light source can be readily obtained, and waste of light can be prevented, whereby economical surface light sources can be obtained. Another advantage of this invention is that, even if the surface for illumination and the like is broad, the surface light source device can be made very thin. On the other hand, by this invention, by imparting light rays containing a light image, it is converted into a picture, and it becomes possible to view it on a screen surface; further, by inversion of the direction of the light, various uses can be made of the devices.

INDUSTRIAL APPLICABILITY

In addition to the already described uses, this invention can be used also for picture frame type panels in which photographic films, etc., are inserted, headlights of motor vehicles, fog lamps, tail lights, etc. In the case where it is used for illumination of motor vehicles, when viewed from an on-coming vehicle, dazzling glare is not sensed in the headlight surface and the fog lamp surface. Further, the headlights, fog lamps, etc., are not those in which the light source parts are small, and light emitted therefrom is caused to diverge as in the prior art but can be so adapted that, for example, parallel light rays are emanated forward from the front part of a motor vehicle over its entire width, whereby they become very effective. This invention, furthermore, also makes possible illumination by lighting up walls, ceilings, etc., of room interiors, for example, over their entire surfaces, reproducing pictures on these surfaces, and projecting pictures therefrom to outside wall surfaces. Further, the principle of this invention can be applied to liquid-crystal display devices, optical measuring instruments and the like.

I claim:

1. A device for controlling light images comprising:
light source means forming a light spot or light spot group;
reflection means positioned relative to said light source means for receiving all of the light rays from the light source means and reflecting the light rays; and
light direction changing surface means positioned relative to said reflection means for receiving the reflected light rays from the reflection means;
said reflection means having a generally planar fresnel mirror type reflecting surface having thereon a plurality of minute prism-shaped elements disposed in minute parallel ridges, the angles of the surfaces of the ridges causing the light to be reflected therefrom in non-parallel directions for spreading the light rays in a uniform light intensity distribution on the light direction changing surface means.

2. A device as claimed in claim 1 in which the light source means is a light spot.

3. A device as claimed in claim 1 in which the light source means is a light image.

4. A device as claimed in claim 1 in which the light source means is positioned over the central part of the reflection means.

5. A device as claimed in claim 1 in which the light source means is on one lateral side of the reflection means.

6. A device as claimed in claim 1 in which said light direction changing surface means comprises a thin plate having a surface facing the reflecting surface of the reflection means.

7. A device as claimed in claim 6 in which said surface of the thin plate is a fresnel-type surface having a plurality of parallel sawtooth shape prisms thereon and said plate is transparent and constitutes a fresnel lens.

8. A device as claimed in claim 6 in which said surface of the thin plate is a smooth surface, and the thin plate is made of a light diffusing material.

9. A device as claimed in claim 1 in which said light direction changing surface means comprises means for changing the direction of the light rays received from the reflection means to predetermined directions.

10. A device as claimed in claim 1 in which said light direction changing surface means comprises means for changing the direction of the light rays received from the reflection means to parallel light rays.

11. A device for controlling light images comprising:
light source means forming a light spot or light spot group;
reflection means positioned relative to said light source means for receiving all of the light rays from the light source means and reflecting the light rays; and
light direction changing surface means positioned relative to said reflection means for receiving the reflected light rays from the reflection means;
said reflection means having a generally curved fresnel mirror type reflecting surface having thereon a plurality of minute prism-shaped elements disposed in minute parallel ridges, the angles of the surfaces of the ridges causing the light to be reflected therefrom in non-parallel directions for spreading the light rays in a uniform light intensity distribution on the light direction changing surface means.

12. A device as claimed in claim 11 in which the light source means is a light spot.

13. A device as claimed in claim 11 in which said light direction changing surface means comprises a thin plate having a surface facing the reflecting surface of the reflection means.

14. A device as claimed in claim 11 in which said light direction changing surface means comprises means for changing the direction of the light rays received from the reflection means to predetermined directions.

15. A device for controlling light images comprising:
light source means forming a light spot or light spot group;
reflection means positioned relative to said light source means for receiving all of the light rays from the light source means and reflecting the light rays; and
light direction changing surface means positioned relative to said reflection means for receiving the reflected light rays from the reflection means;
said reflection means having a smooth curved reflecting surface having a shape for causing the light to be reflected therefrom in non-parallel directions for spreading the light rays in a uniform light intensity distribution on the light direction changing surface means.

16. A device as claimed in claim 15 in which said smoothly curved surfaces comprises a convex portion in the vicinity of the light source means and a concave portion forming the remainder of the curved surface and smoothly joined to the convex portion.

17. A device as claimed in claim 15 in which the light source means is a light spot.

18. A device as claimed in claim 15 in which the light source means is a light image.

19. A device as claimed in claim 15 in which the light source means is positioned over the central part of the reflection means.

20. A device as claimed in claim 15 in which the light source means is on one lateral side of the reflection means.

21. A device as claimed in claim 15 in which said light direction changing surface means comprises a thin plate having a surface facing the reflecting surface of the reflection means.

22. A device as claimed in claim 15 in which said surface of the thin plate is a fresnel-type surface having a plurality of parallel sawtooth shape prisms thereon and said plate is transparent and constitutes a fresnel lens.

23. A device as claimed in claim 15 in which said light direction changing surface means comprises means for changing the direction of the light rays received from the reflection means to parallel light rays.

24. A device as claimed in claim 15 in which said light direction changing surface means and said reflection means are in spaced opposed relationship, and said device further comprises a reflection mirror between the respective means and directed toward said reflection means, said reflection means having an opening therein opposite said reflecting mirror, said light source means being on the opposite side of said reflection means from said mirror and directing the light therefrom through said opening onto said reflecting mirror for reflection onto said reflection means, and the reflection means having a surface shaped for reflecting light reflected from the reflecting mirror toward said light direction changing surface means including the part thereof at a position behind the reflecting mirror from said opening.

* * * * *